US012103034B2

(12) United States Patent
Papp et al.

(10) Patent No.: US 12,103,034 B2
(45) Date of Patent: Oct. 1, 2024

(54) PAINT SCRAPER

(71) Applicants: John J. Papp, Warren, CT (US); Marjorie Parkhurst, Colebrook, CT (US)

(72) Inventors: John J. Papp, Warren, CT (US); Marjorie Parkhurst, Colebrook, CT (US)

(73) Assignees: John J. Papp, Warren, CT (US); Marjorie Parkhurst, Colebrook, CT (US)

( * ) Notice: Subject to any disclaimer, the term of this patent is extended or adjusted under 35 U.S.C. 154(b) by 0 days.

(21) Appl. No.: 17/694,949

(22) Filed: Mar. 15, 2022

(65) Prior Publication Data

US 2023/0294125 A1 Sep. 21, 2023

(51) Int. Cl.
*B05C 17/02* (2006.01)
*B08B 1/16* (2024.01)

(52) U.S. Cl.
CPC .......... *B05C 17/0245* (2013.01); *B08B 1/165* (2024.01)

(58) Field of Classification Search
None
See application file for complete search history.

(56) References Cited

U.S. PATENT DOCUMENTS

| | | | | |
|---|---|---|---|---|
| 3,832,749 A * | 9/1974 | Hawk | B05C 17/0245 | 248/688 |
| 5,419,000 A * | 5/1995 | Amato | A47L 13/02 | D4/118 |
| 5,606,761 A * | 3/1997 | Lynch | B25G 3/30 | 15/236.1 |
| 5,857,234 A * | 1/1999 | Hernandez | B44D 3/164 | D4/118 |
| 6,688,367 B1 * | 2/2004 | Ruposky | E04F 21/16 | 15/236.01 |
| 8,991,012 B1 * | 3/2015 | Hilbrant | B25G 3/28 | 16/427 |
| 9,238,247 B1 * | 1/2016 | Giraldo | B05C 17/0245 | |
| 9,242,364 B1 * | 1/2016 | Cratty | B25G 1/043 | |
| 9,364,850 B1 * | 6/2016 | Anderson | B05C 17/0245 | |
| 2005/0050663 A1 * | 3/2005 | Goulet | B05C 17/0205 | 492/19 |
| 2007/0186362 A1 * | 8/2007 | Felix | B05C 17/0245 | 492/19 |
| 2008/0178393 A1 * | 7/2008 | Kinskey | B25G 1/04 | 7/105 |
| 2009/0223064 A1 * | 9/2009 | Venderley | A47L 13/08 | 30/169 |

* cited by examiner

*Primary Examiner* — Bryan R Muller
*Assistant Examiner* — Dana Lee Poon
(74) *Attorney, Agent, or Firm* — Grogan, Tuccillo & Vanderleeden, LLP

(57) ABSTRACT

A paint scraper includes a coupling member configured for attachment to one of a paint roller or extension pole, and a scraper body extending from the coupling member and having an angled forward surface terminating in a knife edge.

10 Claims, 14 Drawing Sheets

PAINT SCRAPER

FIELD OF THE INVENTION

The present invention relates to scraping devices and, more particularly, to a paint scraper configured for attachment to a paint roller.

BACKGROUND OF THE INVENTION

The use of scrapers, especially for the removal of paint and/or surface imperfections, is well known in the prior art. Prior to painting a surface, small bumps or rough areas such as, for example, small drywall imperfections or areas of splattered joint compound must be removed using a scraper. Moreover, during the painting process, fibers from a roller or other debris picked up by the roller may be inadvertently deposited on the surface being painted which, if not removed, can leave unsightly bumps and blemishes in the finished surface.

While various scraping devices for removing these imperfections exist, they are typically stand-alone devices that can be cumbersome to use, are often misplaced, and add to the overall painting time. For example, with existing devices, discovering fibers or debris deposited by a roller during painting typically requires a user to put down the roller, locate the scraping device, use the scraping device to remove the debris from the surface, and again retrieve the roller to resume painting. This process results in increased paint times and general inefficiencies.

In view of the above, there is therefore a need for a paint scraper that is easier to use, is less prone to being misplaced, and which improves painting efficiency as compared to existing processes using known scraper devices.

SUMMARY OF THE INVENTION

It is an object of the present invention to provide a paint scraper.

It is another object of the present invention to provide a paint scraper that can be coupled to a paint roller or extension pole.

These and other objects are achieved by the present invention.

According to an embodiment of the present invention, a paint scraper includes a coupling member configured for attachment to one of a paint roller or extension pole, and a scraper body extending from the coupling member and having an angled forward surface terminating in a knife edge.

According to another embodiment of the present invention, a method of preparing a surface includes the steps of orienting a paint roller so as to apply paint on a surface using a roller cover attached to the paint roller, orienting the paint roller so as to contact a paint scraper affixed to the paint roller with the surface, and moving a knife edge of the paint scraper along the surface to remove debris from the surface.

According to yet another embodiment of the present invention, a paint roller includes a handle, a frame arm extending from the handle, a roller cage connected to the frame arm, and a paint scraper connected to the frame arm.

DETAILED DESCRIPTION OF THE PREFERRED EMBODIMENTS

Figure 1:
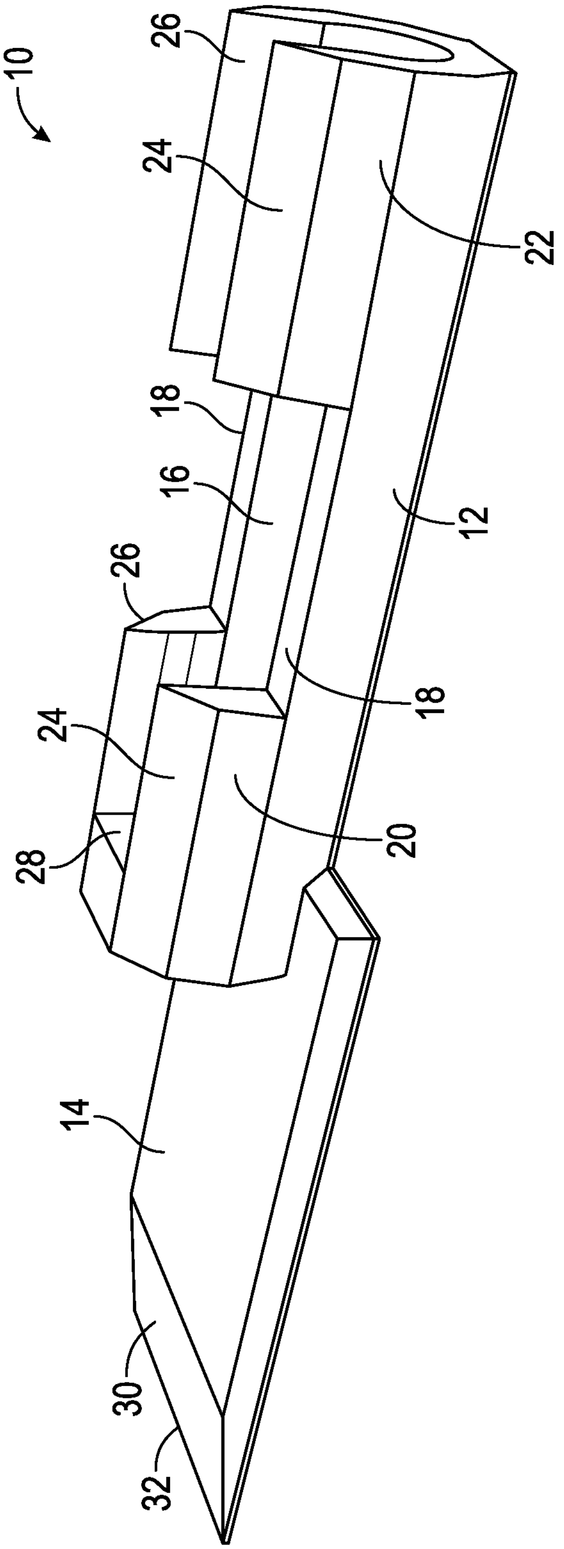
FIG. 1 is a perspective, side view of a paint scraper according to an embodiment of the present invention.
Figure 2:
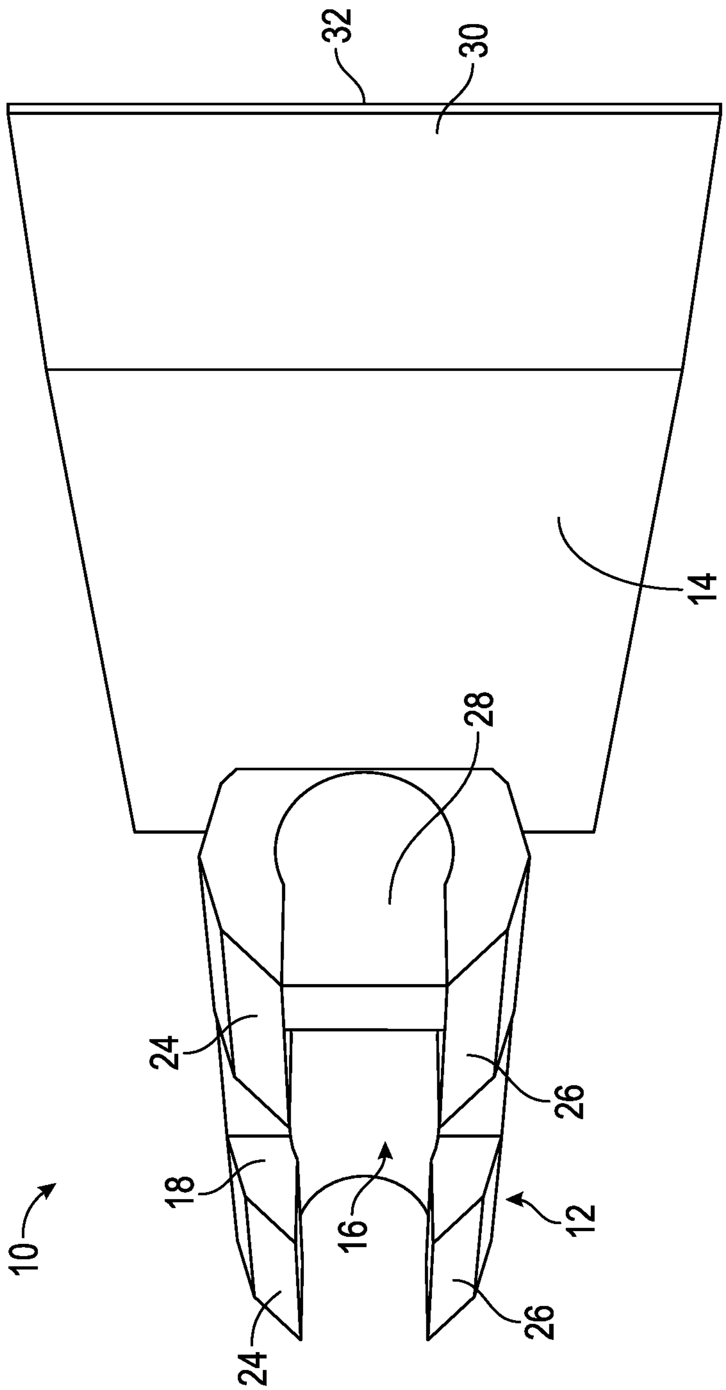
FIG. 2 is perspective, front view of the paint scraper of FIG. 1.
Figure 3:
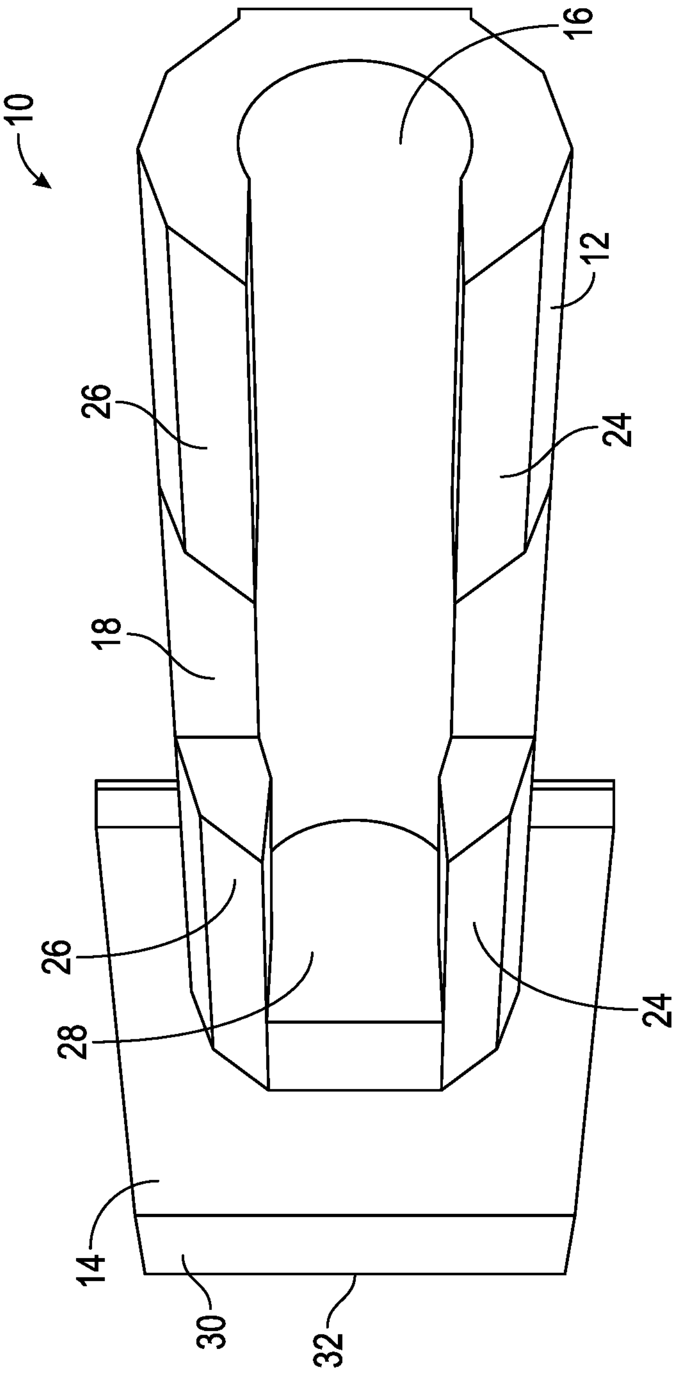
FIG. 3 is a perspective, rear view of the paint scraper of FIG. 1.

Referring to FIGS. 1-3, a paint scraper 10 according to an embodiment of the present invention is shown. The paint scraper 10 includes a coupling member 12 and a scraper body 14 extending from the coupling member 12. In an embodiment, the coupling member 12 is generally cylindrical in shape, although other shapes are possible, and includes a longitudinal slot 16 configured to receive the wire frame arm of a paint roller therein, as described in detail hereinafter. The lower portion of the slot 16 is preferably cylindrical in shape and is sized to generally correspond to the diameter of the frame arm of the paint roller. In an embodiment, the coupling member 12 includes relieved areas 18 on opposing sides of the slot 16 which extend down to about a longitudinal midline of the coupling member 12. The coupling member 12 also includes first and second retention elements 20, 22 each having a pair of opposed retention arms 24, 26 on opposing sides of the slot 16. In an embodiment, the retention arms 24, 26 are formed from a slightly resilient or deflectable materials such as, for example, a polymer, and the distance between the opposed retention arms 24, 26 of each retention element 20, 22 is slightly less than the diameter of the frame arm of a standard paint roller such that the frame arm can be forcibly urged past the retention arms 24, 26 into seated position with in the slot 16, as discussed in detail below. As best shown in FIGS. 1-3, the coupling member 12 also includes a position stop 28 at the end adjacent to the scraper body 14, the purpose of which will be hereinafter described.

As best shown in FIG. 1, the scraper body 14 is generally planar and rectangular in shape, although other shapes are possible, and has and angled, forward portion 30 that terminates in a knife edge 32. In an embodiment, the coupling member 12 and scraper body 14 may be formed from a rubber, hard plastic or metal, although other materials may also be utilized without departing from the broader aspects of the invention.

Figure 4:
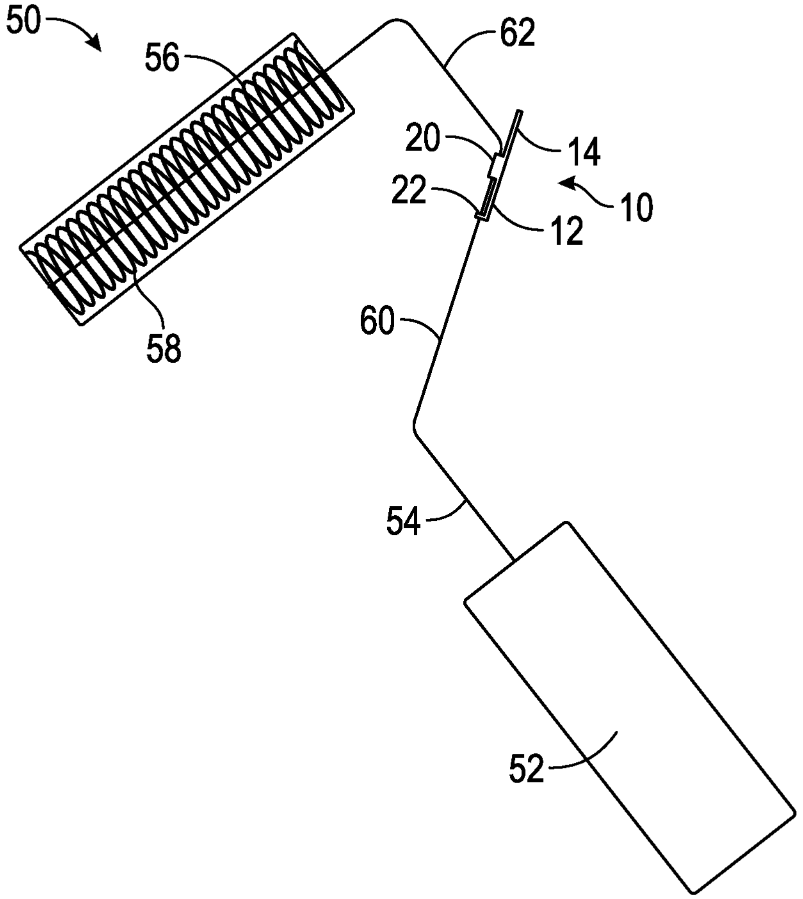
FIG. 4 is a perspective view of the paint scraper of FIG. 1, shown connected to a paint roller.

With reference to FIG. 4, the paint scraper 10 of the present invention is configured to connect to a standard paint roller 50 having a handle 52, a wire frame arm 54 and a paint roller cage 56 configure to receive a paint roller cover 58. In particular, in use, the longitudinal slot 16 is aligned with the wire frame arm 54 of the paint roller 50. The frame arm 54 is then pushed into the slot 16. As the frame arm 54 and coupling member 14 are pressed together, this force causes the opposed retention arms 24, 26 of the retention elements 20, 22 to deflect outwardly, allowing the frame arm 54 to move into seated position within the slot 16. The retention arms 24, 26 then snap back into their original position, retaining the frame arm 54 within the slot 16 via a snap fit. Importantly, the presence of the relieved areas 18 allows a user to push the frame arm 54 into its seated position within the slot 16 (without being obstructed by distal ends of the retention arms 24, 26.

As best shown in FIG. 4, a first leg member 60 of the frame arm 54 is received in the slot 16 of the coupling member 12 while the position stop 28 contacts a second leg member 62 of the frame arm 54. The contact between the second leg member 62 of the frame member 54 (which is oriented at about 90 degrees with respect to the first leg member 60) and the position stop 28 prevents the paint scraper 10 from sliding along the frame arm 54 while in use. As illustrated in FIG. 4, once coupled to the paint roller 50, the scraper body 14 extends laterally outward (in a direction generally perpendicular from the handle 52).

In use, the paint roller 50 can be used to apply paint to a surface in the conventional manner. If surface imperfections, debris (such as dirt or roller fibers) or the like are discovered on the bare surface or a just painted surface, a user can simply tilt the roller 50 to the side and contact the knife edge 32 of the scraper body 14 with the surface. The knife edge 32 can then be gently slide along the surface to remove the imperfection or debris. Painting can then resume using the roller 50 in the conventional manner. Importantly, the only step required to remove debris or imperfections from the surface is to tilt the roller 50 to contact the scraper 10 with the surface rather than the roller cover 58. This is in contrast to stand-alone device which require a user to put down the roller, locate and pick up a stand-alone scraper device, contact it with the wall to remove debris, and again grasp the roller to apply paint to the surface. The paint scraper 10 of the present invention thus decreases the number of steps required to remove imperfections or debris, thus resulting in decreased paint times and less labor.

While the paint scraper 10 of the present invention has hereinbefore been described as employing a snap fit connection with the frame arm of the roller, the present invention is not intended to be so limited in this regard. In particular, it is contemplated that Velcro, clamps, set screws or other fastening means may be utilized to connect the paint scraper 10 to the frame arm 54. In yet other embodiments, it is contemplated that the scraper 10 may be integrally formed with, or otherwise permanently connected to, the frame arm 54.

Figure 5:
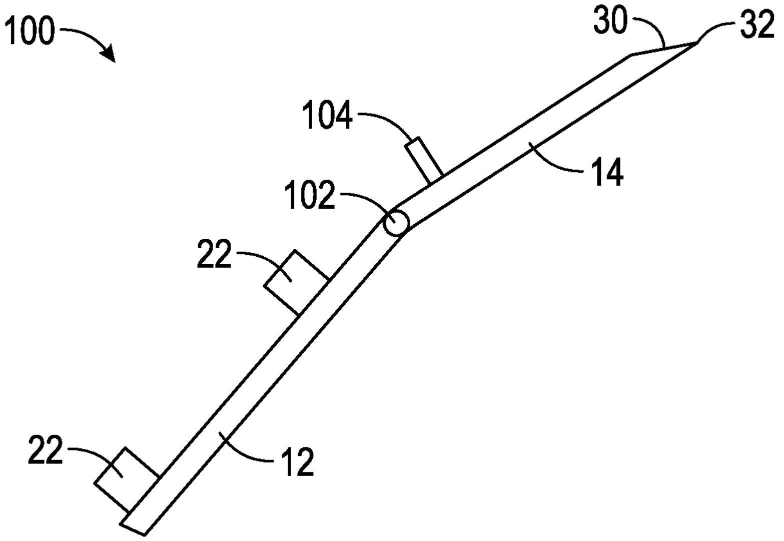
FIG. 5 is a perspective view of a paint scraper according to another embodiment of the present invention.
Figure 6:
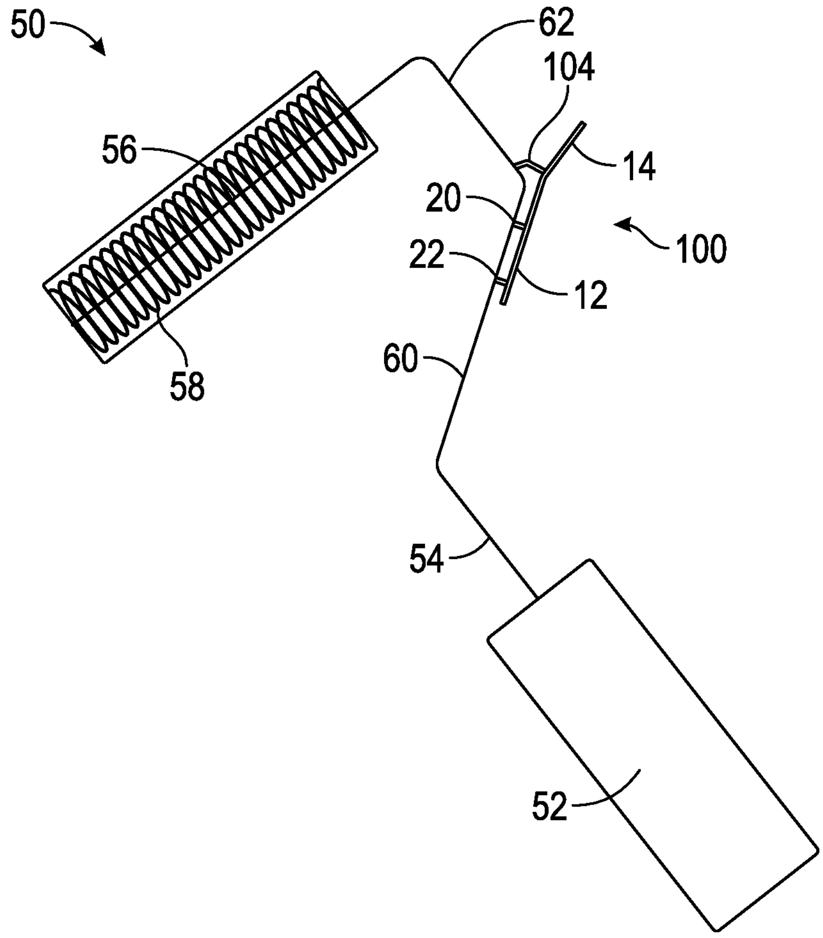
FIG. 6 is a perspective view of the paint scraper of FIG. 5, shown connected to a paint roller.

Turning now to FIG. 5, a paint scraper 100 according to another embodiment of the present invention is illustrated. The paint scraper 100 is generally similar to paint scraper 10, where like reference numbers designate like parts. Rather than the scraper body 14 being rigidly connected to the coupling member 12, however, the scraper body 14 is pivotally connected to the coupling member 12 via a hinge 102. In an embodiment, thee hinge may be a living hinge, although a separate mechanical hinge may also be utilized without departing from the broader aspects of the invention. As further shown in FIG. 5, a third retention element 104 (similar in construction to the retention elements 20, 22) is connected to the scraper body 14 and is utilized to couple the scraper body 14 to the second leg member 62 of the frame arm 54, as shown in FIG. 6. In an embodiment, the third retention element 104 is a hinged clip. The hinged clip 104 provides additional support for the paint scrape 100 when it is connected to the frame arm 54. Importantly, the hinged connection between the scraper body 14 and the coupling member 12 allows the paint scraper 10 to be folded and stowed, or extended/deployed.

Figure 7:
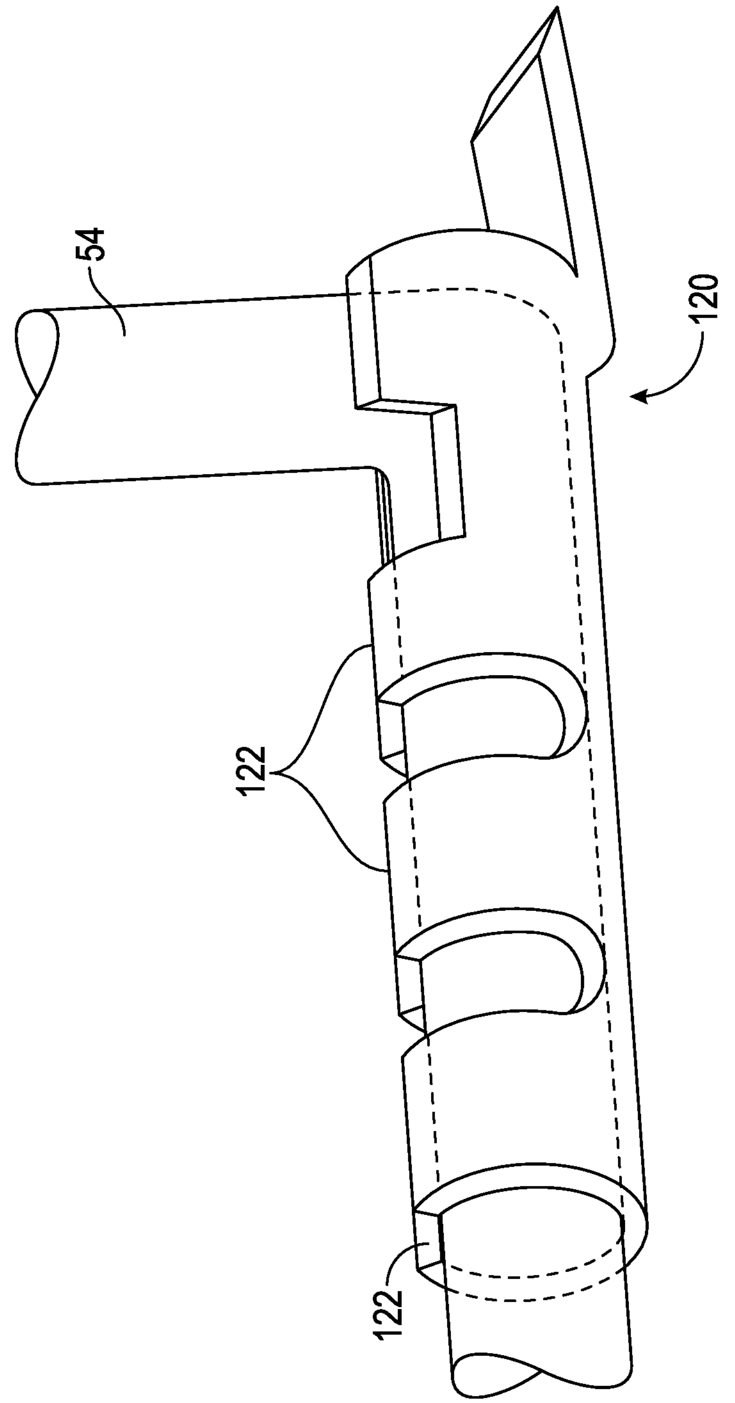
FIG. 7 is a perspective view of a paint scraper showing a means of connection to a paint roller.
Figure 8:
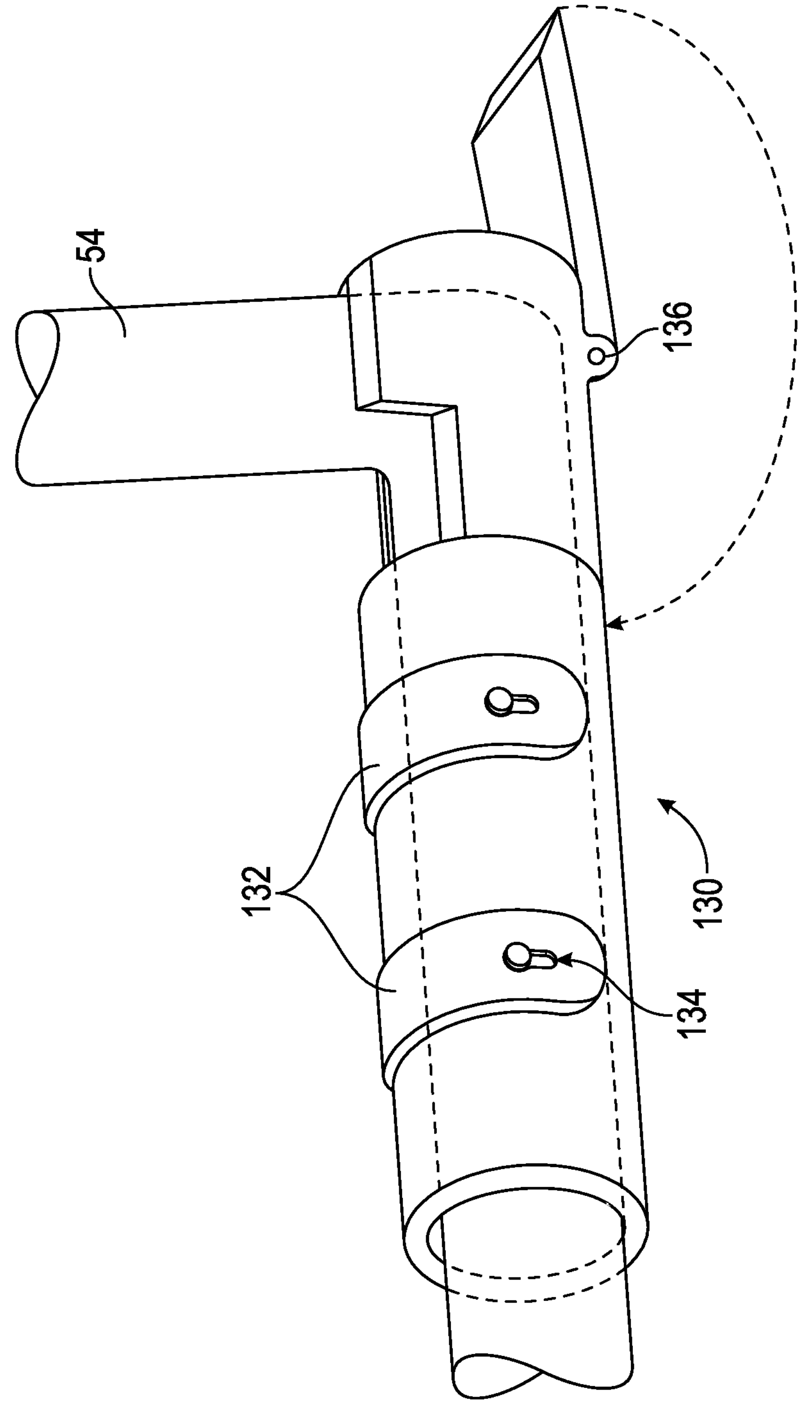
FIG. 8 is a perspective view of a paint scraper showing another means of connection to a paint roller.
Figure 9:
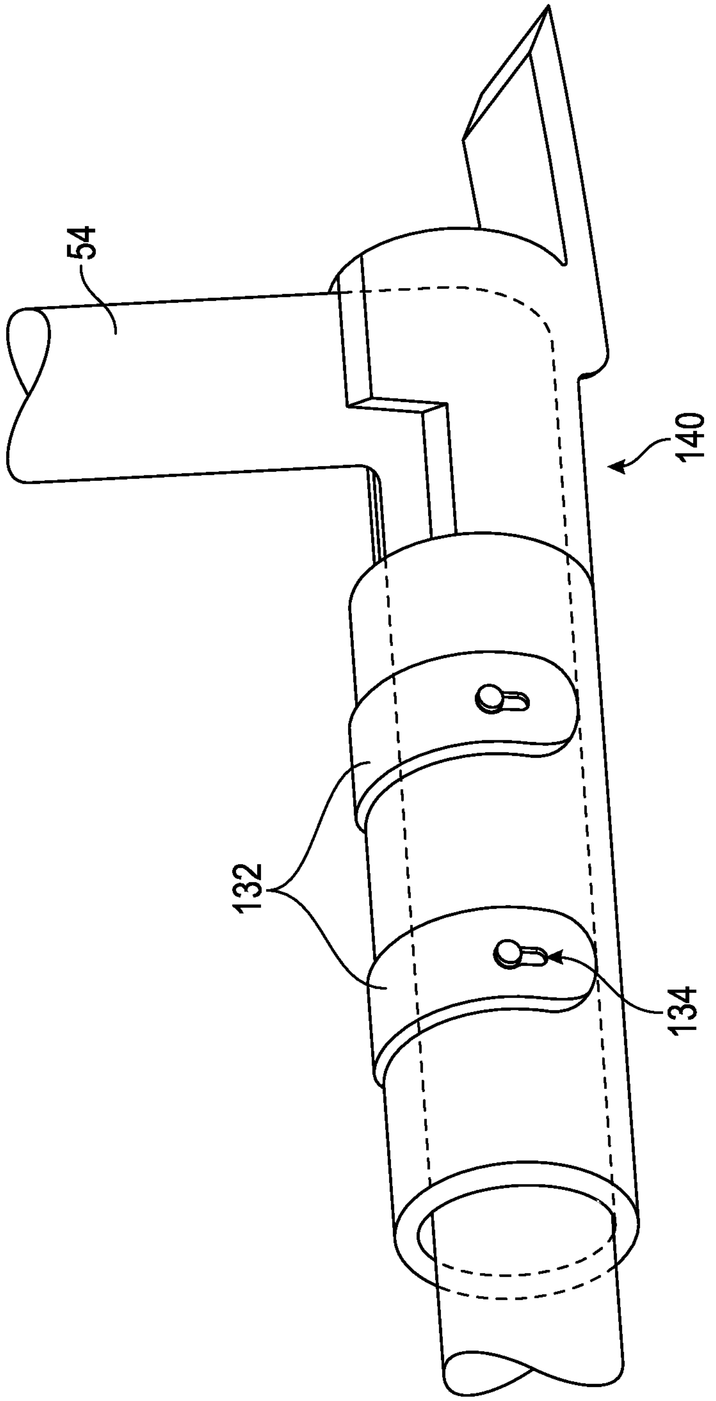
FIG. 9 is a perspective view of a paint scraper showing a means of connection to a paint roller.

As alluded to above, the paint scraper of the present invention may be connected to the frame arm 54 of a paint roller via a variety of means. FIG. 7, for example, illustrates a snap fit connection of a paint scraper 120 (configured similarly to paint scraper 10) using resilient arms or flexible snaps 122. FIG. 8 illustrates a strap connection of a paint scraper 130 (configured similarly to paint scraper 100) using flexible straps 132 and a pin and keyhole connection 134. As shown therein, in the embodiment of FIG. 8, the blade may be folded back about pivot point 136. FIG. 9 shows a similar connection means, although with a fixed blade pain scraper 140.

Figure 10:
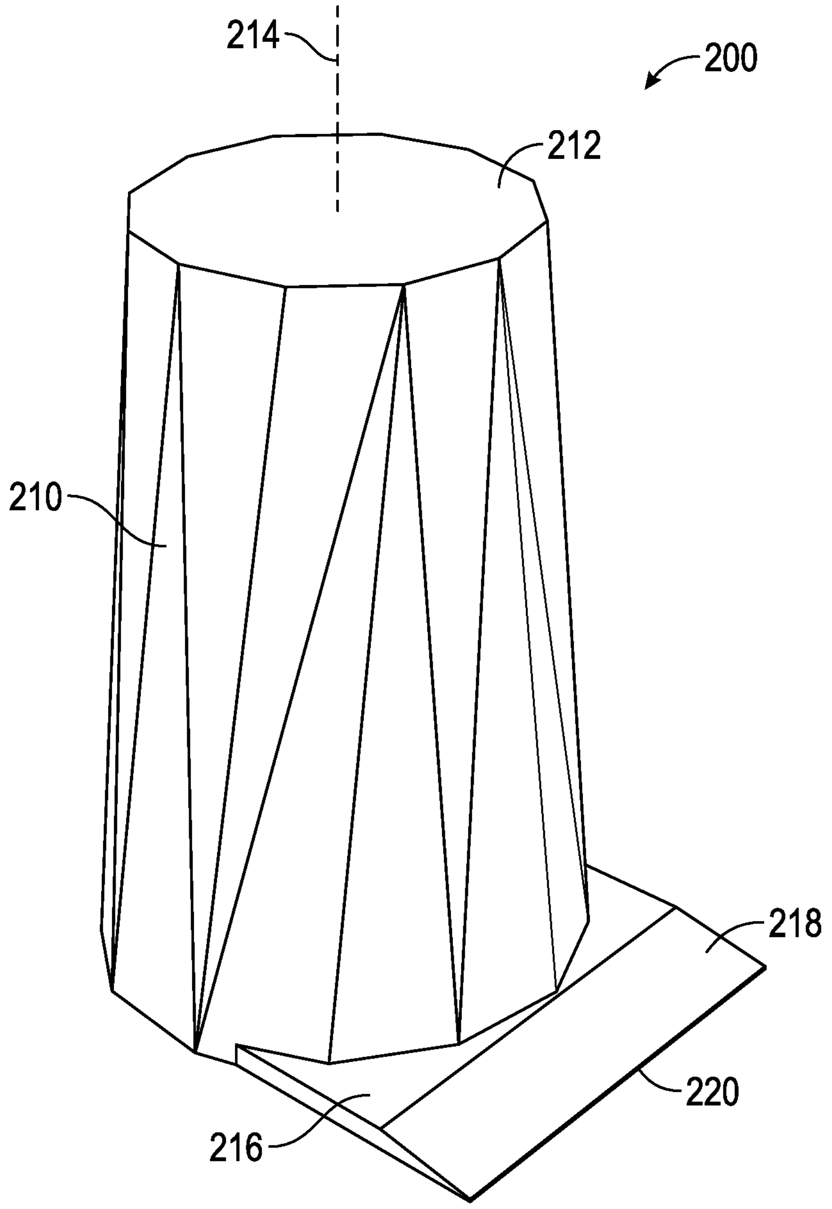
FIG. 10 is a perspective view of a paint scraper according to another embodiment of the present invention.
Figure 11:
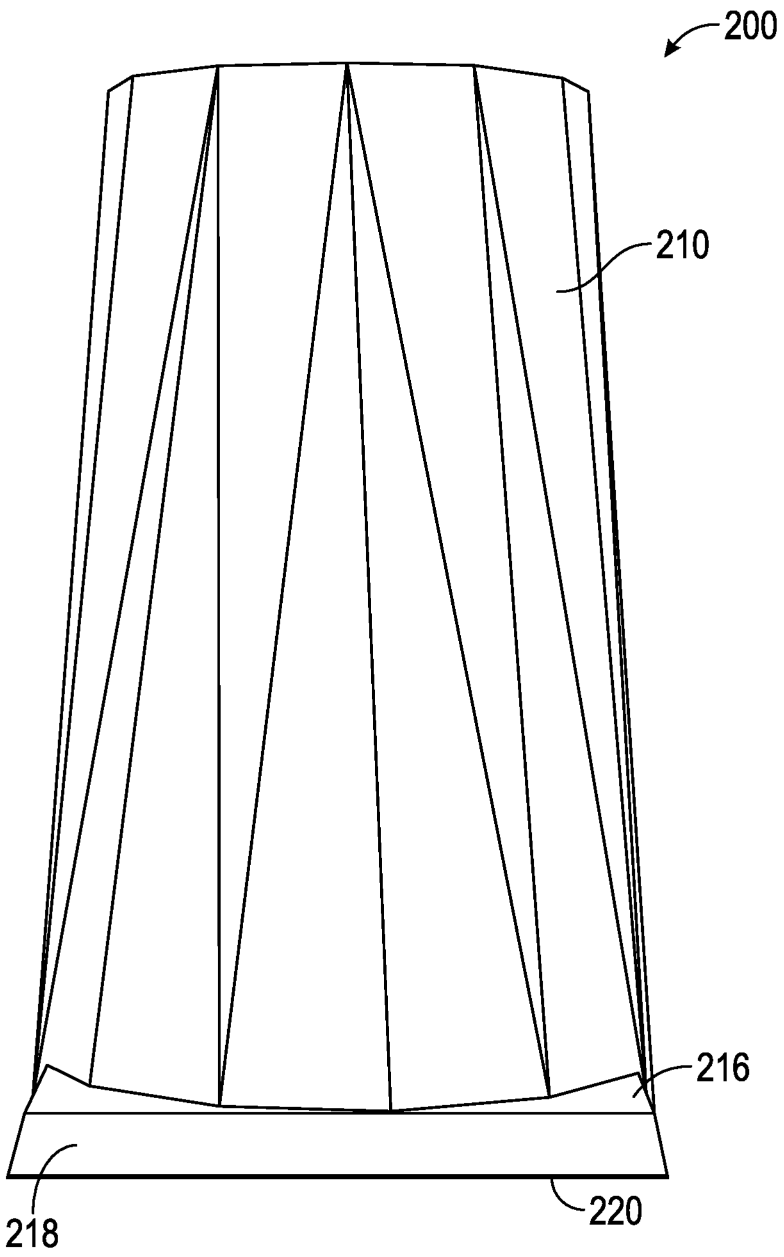
FIG. 11 is a side elevational view of the paint scraper of FIG. 10.
Figure 12:
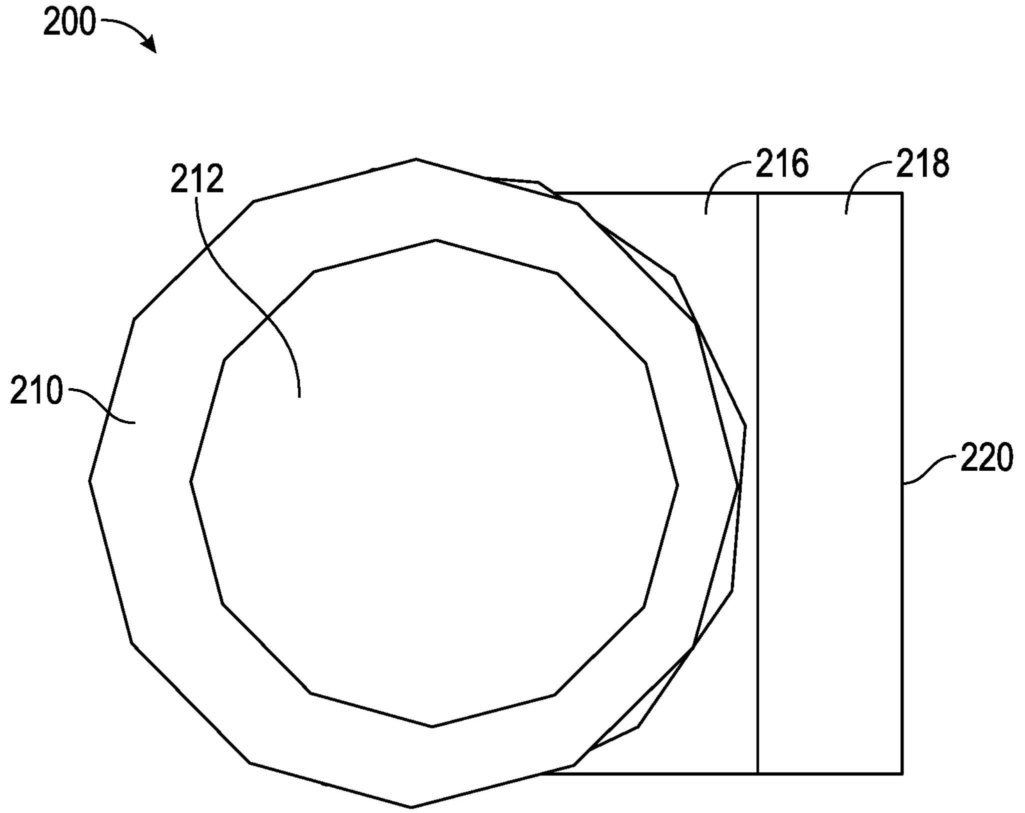
FIG. 12 is an end elevational view of the paint scraper of FIG. 10.

With reference to FIGS. 10-12, a paint scraper 200 according to yet another embodiment of the present invention is illustrated. As shown therein, the paint scraper 200 includes a sleeve 210 having a hollow passage 212 therethrough and defining a longitudinal axis 214, and a scraper body 216 extending from a distal end of the sleeve 210 in a direction generally perpendicular to the longitudinal axis 212. In an embodiment, the sleeve 210 has a generally frusto-conical shape, having a large diameter at the end adjacent to the scraper body 216, and a smaller diameter at the end opposite the scraper body 216. It is contemplated, however, that the direction of the taper may be reversed. In an embodiment, the sleeve may 210 may have a textured or rough outer surface that allows for a reliable grip when attached to the end of an extension pole, as discussed below.

Similar to the embodiment of FIG. 1, the scraper body 216 is generally planar and rectangular in shape, although other shapes are possible, and has and angled, forward portion 218 that terminates in a knife edge 220. In an embodiment, the sleeve 210 and scraper body 216 (including the knife edge) may be formed from rubber, hard/rigid plastic, or metal, although other materials may also be utilized without departing from the broader aspects of the invention. In an embodiment, the sleeve 210 may be formed from an elastomeric or rubber-like material that can be stretched slightly to fit over the existing handle.

Figure 13:
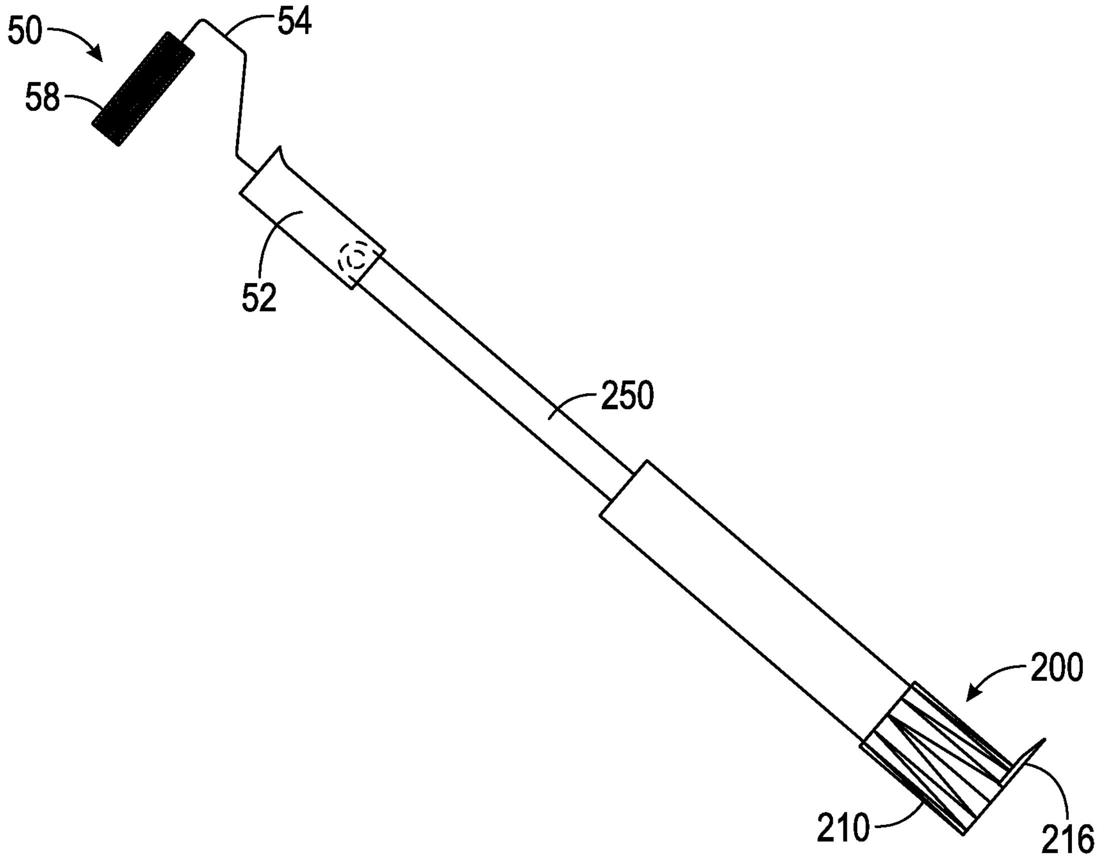
FIG. 13 is a perspective view of the paint scraper of FIG. 10, shown connected to an extension pole of a paint roller.

With reference to FIG. 13, the paint scraper 200 can be connected to the proximal end of an extension pole 250 opposite the end that receives the paint roller 50. As shown therein, the diameter of the hollow passage 212 may be selected such that it is slightly less (either throughout its longitudinal extent or at its narrowest end) than the outside diameter of the proximal end of the extension pole 250. This allows the sleeve 210 to be fit over the proximal end of the pole 250 and held in place by a snug fit.

In use, a user can use the roller end of the extension pole 250 to apply paint in the conventional manner. If surface imperfections, debris (such as dirt or roller fibers) or the like are discovered on the bare surface or a just painted surface, a user can simply flip the extension pole over and use the paint scraper 200 on the proximal end of the pole to remove such debris. Painting can then resume using the roller 50 and extension pole 250 in the conventional manner. Like the embodiments above, instead of being removably connected to the proximal end of the extension pole via a press fit, Velcro or other fastening means, it is contemplated that the paint scraper 200 may be fixedly attached to (or otherwise integral with) the proximal end of the extension pole 250.

Figure 14:
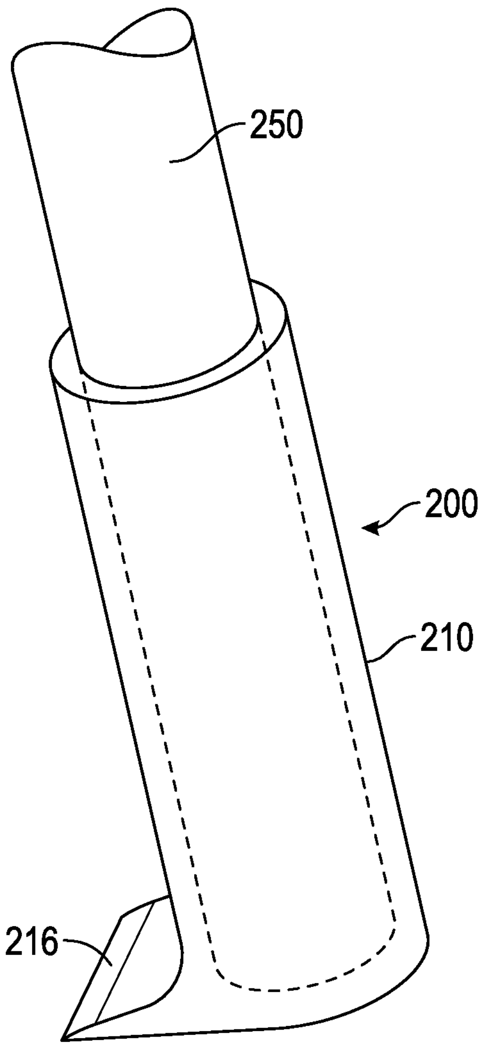
FIG. 14 is a detailed perspective view of the paint scraper of FIG. 10, shown connected to an extension pole of a paint roller.
Figure 15:
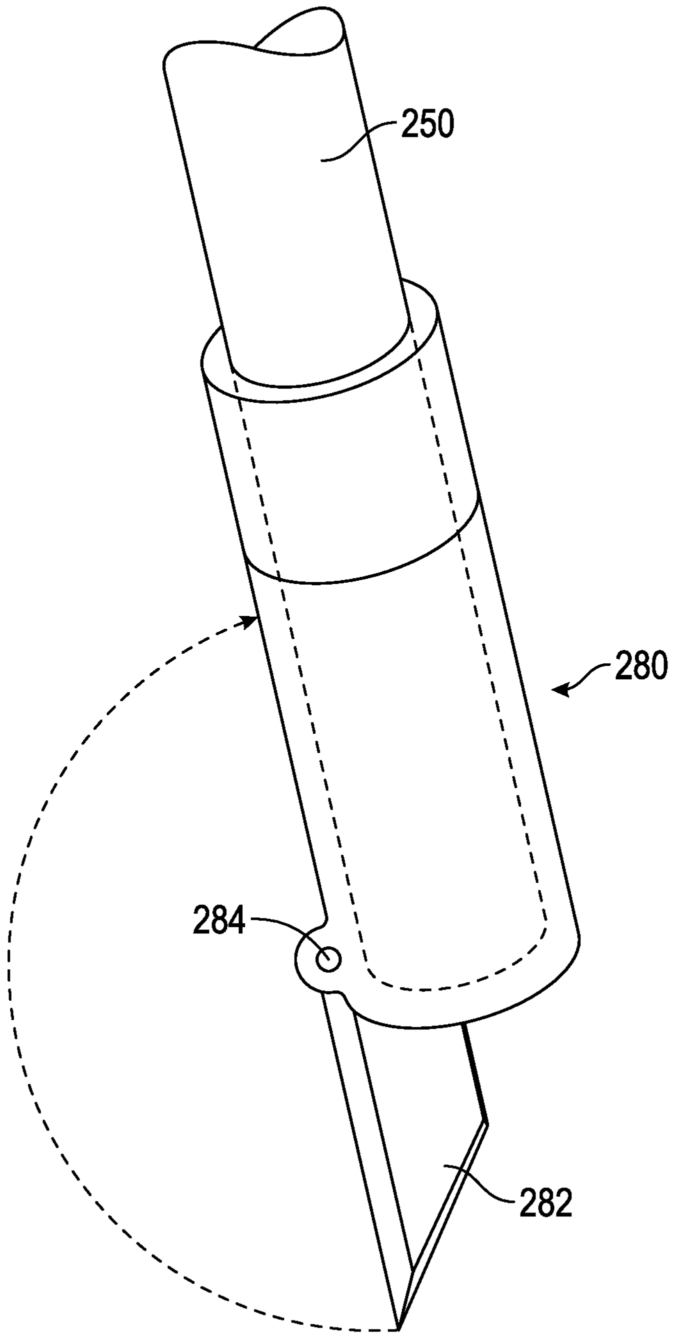
FIG. 15 is a detailed perspective view of another paint scraper, shown connected to an extension pole of a paint roller.

FIG. 14 presents a more detailed view of paint scraper 200 connected to the distal end of pole 250. In an embodiment, the connection may be a press fit connection, although a threaded connection or other connection means may also be employed. FIG. 15 shows a similar paint scraper 280 connected to pole 250 in a similar manner, although scraper 280 has blade 282 rotatable about pivot point 284.

It is contemplated that in some embodiments, both the paint scraper 200 and paint scraper 10 or 100 may be utilized in combination (so that the frame is outfitted with a first paint scraper, and the proximal end of the extension pole is outfitted with a second paint scraper).

As will be appreciated, the present invention therefore provides paint scrapers that are intended to be selectively affixed to a paint roller or extension pole thereof, which can be easily deployed and utilized without having to put down the roller and access a dedicated tool. In this manner, the present invention provides a two-in-one paint roller and scraper device that is useable to quickly and easily remove surface imperfections or debris on a surface to be, or being, painted.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A paint scraper, comprising:

a coupling member including a longitudinally-extending, thin-walled sleeve having a hollow passageway, the hollow passageway being configured to receive a proximal end of one a paint roller or an extension pole at the same time as a roller for applying paint is received on an opposing, distal end of the paint roller or extension pole; and a scraper body extending perpendicularly from the sleeve and the paint roller or extension pole when attached thereto, and having an angled forward surface terminating in a knife edge;

wherein the sleeve is formed from an elastomeric, thin, stretchable material such that the sleeve is configured to stretch so as to be received over the proximal end of the paint roller or extension pole and so as to be secured thereto via a press fit connection.

2. The paint scraper of claim 1, wherein:

the scraper body is planar.

3. The paint scraper of claim 1, wherein:

the hollow passageway of the sleeve is frusto-conical in shape, having a large diameter at an end adjacent to the scraper body and a smaller diameter at an end opposite the scraper body to facilitate coupling of the sleeve to the paint roller or extension pole.

4. The paint scraper of claim 1, wherein:

the sleeve has a textured outer surface.

5. The paint scraper of claim 1, further comprising:

an extension pole received in the hollow passageway of the sleeve.

6. The paint scraper of claim 1, wherein:

the sleeve has a circular cross-section and is configured to entirely encircle a peripheral surface of the extension pole at the proximal end of the extension pole.

7. The paint scraper of claim 1, wherein:

the scraper body is rotatably connected to the coupling member.

8. A paint scraper, comprising:

an extension pole having a proximal end and a distal end;

a paint roller connected to the distal end of the extension pole; and a scraping device connected to the proximal end of the extension pole, the scraping device including a longitudinally extending sleeve having a hollow passageway and a scraper body extending perpendicularly from the sleeve and the extension pole and having an angled forward surface terminating in a knife edge;

wherein the sleeve is formed form an elastomeric, stretchable material such that the sleeve is configured to stretch over the proximal end of the extension pole so as to be received thereon; and wherein the hollow passageway has a circular cross-section.

9. The paint scraper of claim 8, wherein:

the hollow passageway of the sleeve is frusto-conical in shape, having a large diameter at an end adjacent to the scraper body and a smaller diameter at an end opposite the scraper body, and the hollow passageway has a circular cross section.

10. The paint scraper of claim 9, wherein:

the scraper body is rotatably connected to the sleeve.

* * * * *